United States Patent [19]

Romand

[11] 4,183,391

[45] Jan. 15, 1980

[54] VEHICLE TIRE

[75] Inventor: Jean C. Romand, Mareil en France, France

[73] Assignee: Pneumatiques, Caoutchouc Manufacture et Plastiques Kleber-Colombes, France

[21] Appl. No.: 786,771

[22] Filed: Apr. 12, 1977

[30] Foreign Application Priority Data

Apr. 12, 1976 [FR] France ................................ 76 10621

[51] Int. Cl.² ................................................ B60C 9/18

[52] U.S. Cl. ................................................ 152/361 R

[58] Field of Search ...... 152/361 R, 361 DM, 361 FP

[56] References Cited

U.S. PATENT DOCUMENTS

| | | | |
|---|---|---|---|
| 1,894,237 | 1/1933 | Mallory | 152/361 R |
| 2,945,525 | 7/1960 | Lugli | 152/361 R |
| 2,958,359 | 11/1960 | Boussu et al. | 152/361 R |
| 3,570,574 | 3/1971 | Marker | 152/361 R |
| 3,830,276 | 8/1974 | Smithkey | 152/361 FP |
| 3,945,420 | 3/1976 | Gorter et al. | 152/361 R |

FOREIGN PATENT DOCUMENTS

| | | | |
|---|---|---|---|
| 2201623 | 7/1972 | Fed. Rep. of Germany | 152/361 R |
| 2361944 | 6/1975 | Fed. Rep. of Germany | 152/361 R |
| 1389428 | 7/1963 | France | 152/361 R |

*Primary Examiner*—Joseph F. Peters, Jr.
*Assistant Examiner*—D. W. Underwood
*Attorney, Agent, or Firm*—Craig and Antonelli

[57] ABSTRACT

A pneumatic tire is disclosed having a top belt under the tread, which belt comprises two superimposed plies made of cables having a high modulus of elasticity. The upper ply is narrower than the lower ply. Lateral strips, which are co-extensive with the circumferential length of the plies, are joined to each of the edges of the two plies. Each lateral strip is co-extensive with the ply to which it is joined and constitutes a layer of flexible circumferentially extending cables embedded in rubber and is joined end-to-end on a bias whose angle is the same as that of the respective plies to which they are joined.

4 Claims, 5 Drawing Figures

18 17 15 14 17 18 16 16 $14_1$ $14_2$ 10

17
15
14
16
17
16
$14_1$
$14_2$
13
10
13
11
11
12
12

17
15
14
18
17
18
16
16
$14_1$
$14_2$
10

17
16
15
17
16
$14_1$
$14_2$
10 a
20a
m
m
d
20b
b
A
16
16
$14_1$

VEHICLE TIRE

The invention relates to vehicle tires and, more particularly, to pneumatic tires of the type with a radial carcass and a top belt extending transversely under the tread wherein the belt is constituted by two superimposed plies of cables of a high modulus such that the metallic cables which cross from one ply to the other form slight angles of the order of 20° with respect to the equatorial plane of the tire.

If tires of this type are exposed to intense work, one can observe deterioration arising from detachments which begin at the rims of the belt. These deteriorations originate generally from the degradation of the rubber surrounding the rims of the belt as a consequence of the heating and fatigue due to movements of shear of the intersecting cables of the belt plies when the tire is flattened in the contact zone with the ground. The phenomenon can even appear at moderate speeds; it is manifested by a lack of endurance of the tire. The phenomenon is obviously amplified at higher speeds, on the order of 200 km./h. and in such a case it can be aggravated by the action of the centrifugal force which tends to radially separate the rims of the belt and to subject the rubber located between the edges of the superimposed plies to tensile forces.

It is an object of the invention to eliminate these deficiencies by simple and economical means so that the tires of the type under consideration withstand the wear at moderate speeds, as well as the use at elevated speeds.

Examples of realizing the invention are described hereinbelow with reference to the appended drawings wherein.

Figure 1:
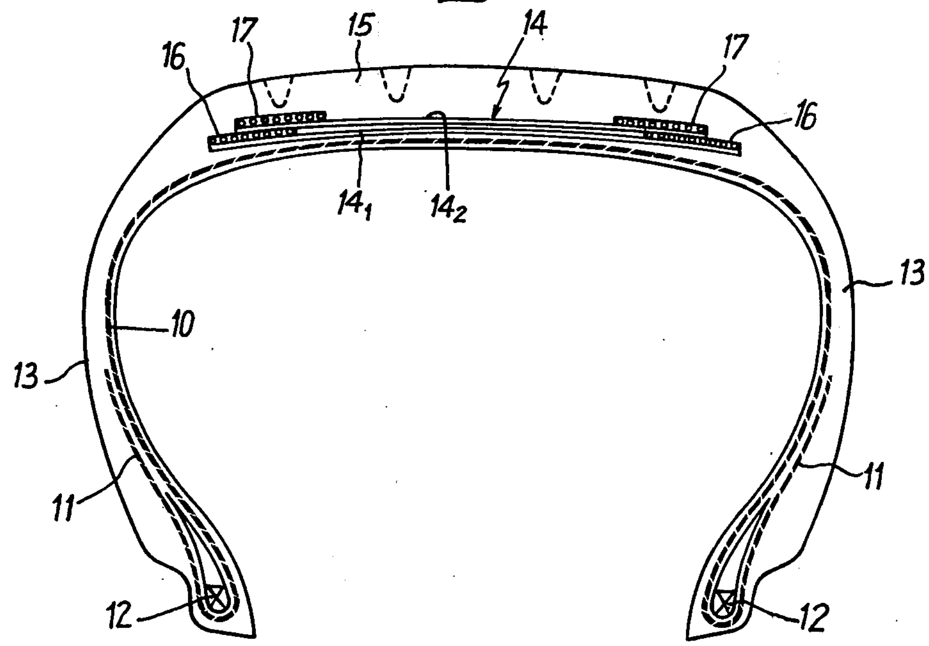
FIG. 1 is an elevational view in cross section of a first embodiment of the invention.
Figure 2:
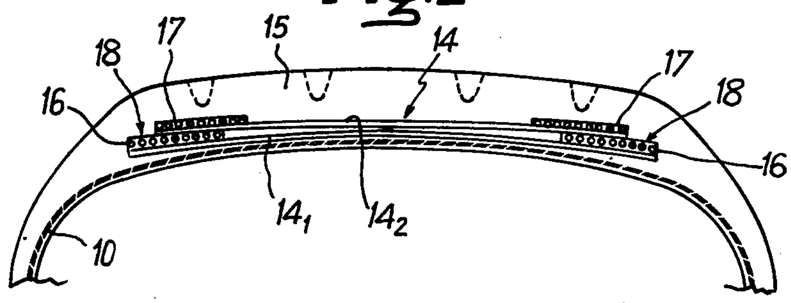
FIGS. 2 and 3 are partial views in cross section, showing the tops of the tires according to two other embodiments.
Figure 3:
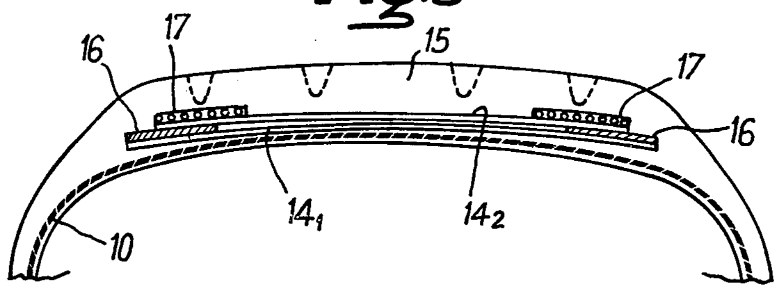

The tires illustrated in FIGS. 1-3 comprise a carcass 10 constituted of one or several plies of cord fabric in flexible cables which are radially oriented. The edges 11 of these plies are folded around the wires 12 of the head. The carcass 10 is covered on the sides by the sidewall strips 13 and carries on its top a reinforcing belt 14, on top of which is the tread 15 which is provided with the tread design appropriate for the use of the tire.

The belt 14 extends transversally following approximately the width of the tread 15 and is constituted by two superimposed plies 14.1, 14.2 in cables of a high modulus, for example of metal, forming slight angles in opposition of the order of 20° with respect to the equatorial plane. These two belts present thicknesses which slightly decrease so that their edges form tiers. Each of these plies 14.1, 14.2 is surrounded on the outside, but only at the edges, by lateral reinforcing strips 16, 17 of high resistance in the circumferential direction to prevent the edges of the belt plies from separating and, in particular, from radially spreading apart under the action of the centrifugal force when the tire is utilized at an increased speed.

In this construction, the lateral strips 16 located above the edges of the inner ply $14_1$ of the belt are held in sandwich form between the edges of both superimposed plies $14_1$–$14_2$ and thus form intermediate elements absorbing the shearing forces caused by the deformations of the belt when passing into the contact zone of the tire with the ground. The lateral strips 16–17 extend transversely starting from the lateral edges of the belt plies $14_1$–$14_2$ along a distance of 20–40 mm. according to the dimension of the tire, the central portion of the belt 14 remaining free to assure maximum comfort.

In the case of FIG. 1, the lateral cover strips 16–17 are all constituted by parallel, flexible cables (of any kind of textile material or metal) oriented in the circumferential direction. These strips can be obtained by helically winding of a continuous flexible cable or by a small number of cables. They can also be obtained by winding a circle of a ribbon of flexible, longitudinal cables, the cut ends of this ribbon being joined edge-to-edge or with a slight overlapping.

In the case of FIG. 2, the lateral strips 16, 17 are again made of flexible, circumferential cables, but the strips 16 are here associated with a rubber layer 18 which is relatively thick to better absorb the shearing forces developed between the superimposed edges of the belt plies 14.1, 14.2. As will be apparent from FIG. 2, the rubber layer 18 is at least as thick as the cables 16 in the strip. This rubber layer 18 can be placed underneath or over the strips 16 or on each side of these strips, the cables of these strips 16 being in this case embedded in the middle of this thick rubber layer.

The expression thick rubber layer signifies here that the rubber layer located on top or underneath the cable strips 16 is at least of the same thickness as these cables. The strips 16 thus have a thickness at least equal to twice the thickness of the cables (if the strips have a single rubber layer 18) or at least equal to three times the thickness of the cables, if these strips have two rubber layers 18 located on both sides of the cables.

In the case of FIG. 3, the lateral strips 16 which surround the edges of the ply 14.1 are constituted entirely of a rubber blend having a high modulus of elasticity at least in the circumferential direction of the tire. The strips 16 can be realized, for example, by an anisotropic rubber blend provided with short fibers oriented along the longitudinal or circumferential direction.

In either of the preceding embodiments, the lateral surrounding strips 16–17 are advantageously disposed initially on the belt plies 14.1, 14.2, i.e. before these plies are mounted on the tire and while they are still in the stage of uninterrupted plies.

Figure 4:
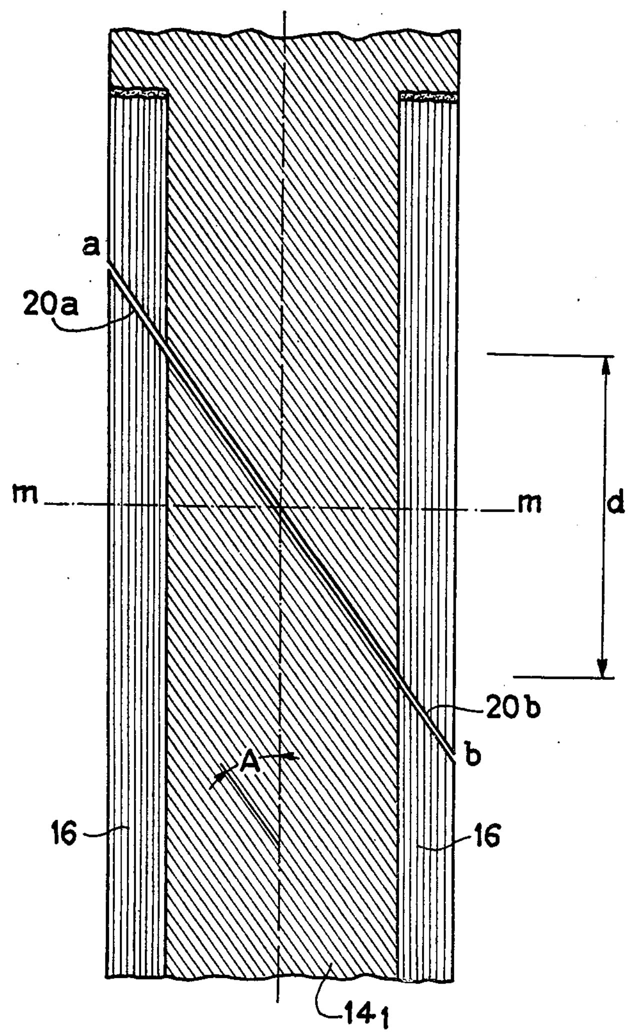
FIG. 4 is a plan view illustrating the way of joining a belt ply according to the invention.
Figure 5:
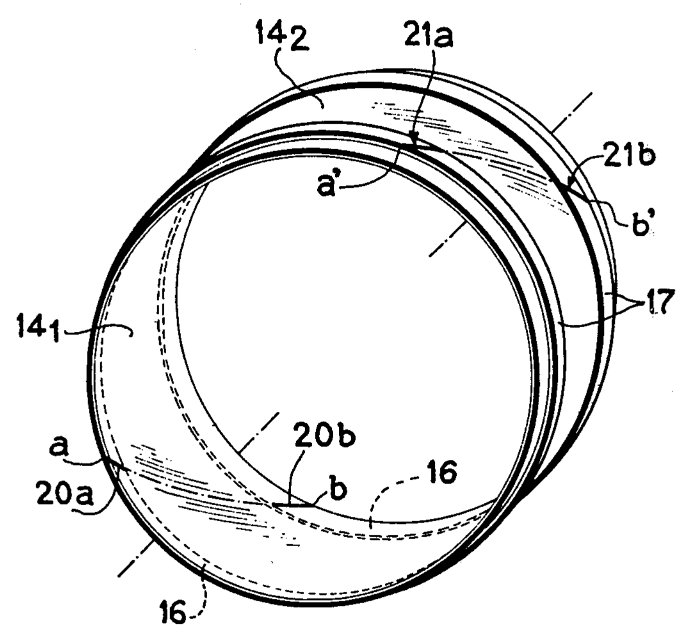
FIG. 5 is a perspective view of a belt with two plies, showing the circumferential displacement of the junctions or bonds of the plies of this belt.

In this case, the belt 14 is then realized in the following manner. An uninterrupted belt ply such as $14_1$ (FIG. 4) constituted of parallel cables oriented at an acute angle A of the order of 20° is provided with lateral uninterrupted plies such as 16 extending from the lateral edges of the ply $14_1$ and is cut at a bias following a-b between two of its neighboring cables, along the circumference of the belt, the lateral strips 16 being cut at the same time at a bias along a-b. The two ends of the ply 16 thus cut at a bias are then made to approach each other along the line of bias a-b to unite to an annular belt element. The ends of strips 16 are thus joined edge-to-edge at the same time as the ends of the ply $14_1$ but due to the bias cut along a-b and the transverse spacing of the strips 16, the junctions **20*a*–20*b* of the strips 16 are displaced circumferentially one with respect to the other by a distance d, on either side of the median meridian plane m—m of the junction. To complete the belt 14, another belt ply $14_2$ is provided in the same manner with lateral strips 17, but in this ply the cables are oriented at a bias following an opposite symmetrical angle (or neighbor) of angle A. This ply $14_2$ is cut at a bias between both of its neighboring cables; it is superimposed on ply $14_1$, and its ends are brought together and joined in the same manner but following the first ply $14_1$ so that there the junctions 21***a*, 21*b* of the strips 17 are still displaced circumferentially. Furthermore, on the completed belt (FIG. 5) the two junction lines a b and a' b' are displaced by 180°. Consequently, in the finished tire, all of the junctions 20–21 of the lateral strips 16 and 17 of the belt are circumferentially displaced with respect to one another and do not create any localized weak spots. In this manner, the surrounding strips 16–17 function maximally efficiently to withstand high speeds as well as prolonged stresses. Of course, the above-described construction of the belt can be effected either directly on the carcass 10 of the tire or on a separate construction element, the annular belt 14 being thereafter transferred to the carcass of the tire. In either case, and due to the fact that the surrounding strips 16–17 are aligned with the edges of the plies $14_1$–$14_2$, this construction method lends itself very well to a very automated manufacture. On the other hand, it permits a precise balancing of the tires around their axis of rotation and a good uniformity of the series-produced tires.

I claim:

1. A tire having a radial carcass, a tread, and a belt under said tread extending transversely approximately the width of the tread, said belt comprising a pair of inner and outer superimposed plies, the other ply of said pair of plies being narrower than the inner ply of said pair of plies, each of said plies being made of cables having a high modulus of elasticity and forming slight opposite angles on the order of 20° with respect to the equatorial plane of the tire, outer lateral strips arranged on the outer ply along the outside edges of the outer ply and inner lateral strips arranged on the inner ply along the outside edges of the inner ply, a portion of each of said inner lateral strips extending between said inner and outer plies, each of said lateral strips extending transversely from an outside edge of a belt ply inward toward the center of the belt a distance of 20–40 mm., being co-extensive with the circumferential length of one of said plies, and being comprised of a layer of flexible circumferential cables embedded in rubber.

2. A tire having a radial carcass, a tread, and a belt under said tread extending transversely approximately co-extensive with the width of the tread, said belt comprising a pair of superimposed inner and outer plies, the outer ply of said plies being narrower than the inner ply, each of said plies being made of cables having a high modulus of elasticity and forming opposite slight angles on the order of 20° with respect to the equatorial plane of the tire, inner lateral strips of an anisotropic rubber blend provided with short fibers oriented in the circumferential direction arranged on the inner ply on the outside edges thereof, a portion of each of said inner lateral strips extending between said inner and outer plies, and outer lateral strips made of a layer of flexible circumferentially oriented cable in rubber arranged on the outer ply on the outside edges thereof each of said lateral strips extending transversely from an outside edge of a belt ply inward towards the center of the belt a distance of 20–40 mm.

3. A tire according to claim 1, wherein each of the inner lateral strips on the outside edges of the inner belt ply comprises a layer of flexible circumferential cables and a thick shear-resistant rubber layer.

4. A tire according to claim 3, wherein the circumferential cables of the lateral strips are embedded in the midst of the shear-resistant rubber layer.

* * * * *